(12) United States Patent
Maher, III et al.

(10) Patent No.: US 6,654,373 B1
(45) Date of Patent: Nov. 25, 2003

(54) CONTENT AWARE NETWORK APPARATUS

(75) Inventors: Robert Daniel Maher, III, Plano, TX (US); Victor A. Bennett, Rockwall, TX (US); Aswinkumar Vishanji Rana, Plano, TX (US); Milton Andre Lie, McKinney, TX (US); Kevin William Brandon, Dallas, TX (US); Mark Warden Hervin, Plano, TX (US); Corey Alan Garrow, Dallas, TX (US)

(73) Assignee: Netrake Corporation, Plano, TX (US)

( * ) Notice: Subject to any disclaimer, the term of this patent is extended or adjusted under 35 U.S.C. 154(b) by 754 days.

(21) Appl. No.: 09/591,728

(22) Filed: Jun. 12, 2000

(51) Int. Cl.[7] ............................................. H04L 12/56
(52) U.S. Cl. .................... 370/392; 370/429; 370/395.1; 709/240
(58) Field of Search ................................. 370/395, 394, 370/395.71, 516, 230.1, 400, 338, 392, 418, 258, 389, 412, 417, 429; 709/236, 240, 239

(56) References Cited

U.S. PATENT DOCUMENTS

| 5,694,397 A | * 12/1997 | Burton ........................ 370/516 |
| 5,813,001 A | 9/1998 | Bennett |
| 6,130,888 A | * 10/2000 | Tsuboya et al. ....... 370/395.71 |

OTHER PUBLICATIONS

"The Challenge For Next Generation Network Processor" *Agere Inc.*: Sep. 10, 1999.
"Fast Pattern Processor Application Note—ATM AA " *Agere Inc.*: Jun. 28, 1999, Revision 0.4.
"Network Processors" *Electronic Engineering Times: The Fearless Group LTD*. May 8, 2000: 3–30.
"Smartbox: An Add–On Solution For Guaranteed QOS" *USENIX: Yener, Bulent*: Mar. 20, 2000.
"An Overview of QoS" *Microsoft TechNet*.
"Implementing an Intelligent Service Gateway Architecture" *Redback Networks*.
"Considerations for Large Scale IP Subscriber and Service Management" *Redback Networks*.
"Enabling Multiple Broadband Access Technologies and Services" *Redback Networks*.
"Digital Island's Quality of Service (QoS): Delivering QoS With Digital Island's Distributed–Star Architecture" *Cisco Systems, Inc.*
"IP Service Intelligence At The Edge "Enabling Value–Added Services Over DSL"" *Copper Mountain Networks, Inc. Spring Tide Networks, Inc.* Apr. 2000.
"Automated Service Provisioning and Management Enabling the Rapid Deployment of IP Services" *Ennovate Networks*.
"IP Service Creation Architecture "Prerequisite to Service Provider Profitability"" *Ennovate Networks*.
"Advanced QoS Services for the Intelligent Internet" *Cisco Systems, Inc.* 1997.

* cited by examiner

*Primary Examiner*—John Pezzlo
(74) *Attorney, Agent, or Firm*—Craig J. Cox

(57) ABSTRACT

A content aware network device is described that is able to scan the contents of entire data packets including header and payload information. The network device includes a physical interface for converting analog network signal into bit streams and vise versa. The bit stream from the physical interface is sent to a traffic flow scanning processor that may be, but is not necessarily, divided into a header processor and a payload analyzer. The header processor scans the header information from each data packet, which is used to determine routing information and session identification. The payload analyzer scans the data packet's payload and matches the payload against a database of known strings. The payload analyzer is able to scan across packet boundaries and to scan for strings of variable and arbitrary length. Once the payload has been scanned the network device can operate on the data packet based on the results of the payload analyzer. The scanned data packets and the associated conclusions are then passed to a quality of service processor which modifies the data packets if necessary and performs traffic management and traffic shaping on the flow of data packets based on contents of the data packets.

30 Claims, 4 Drawing Sheets

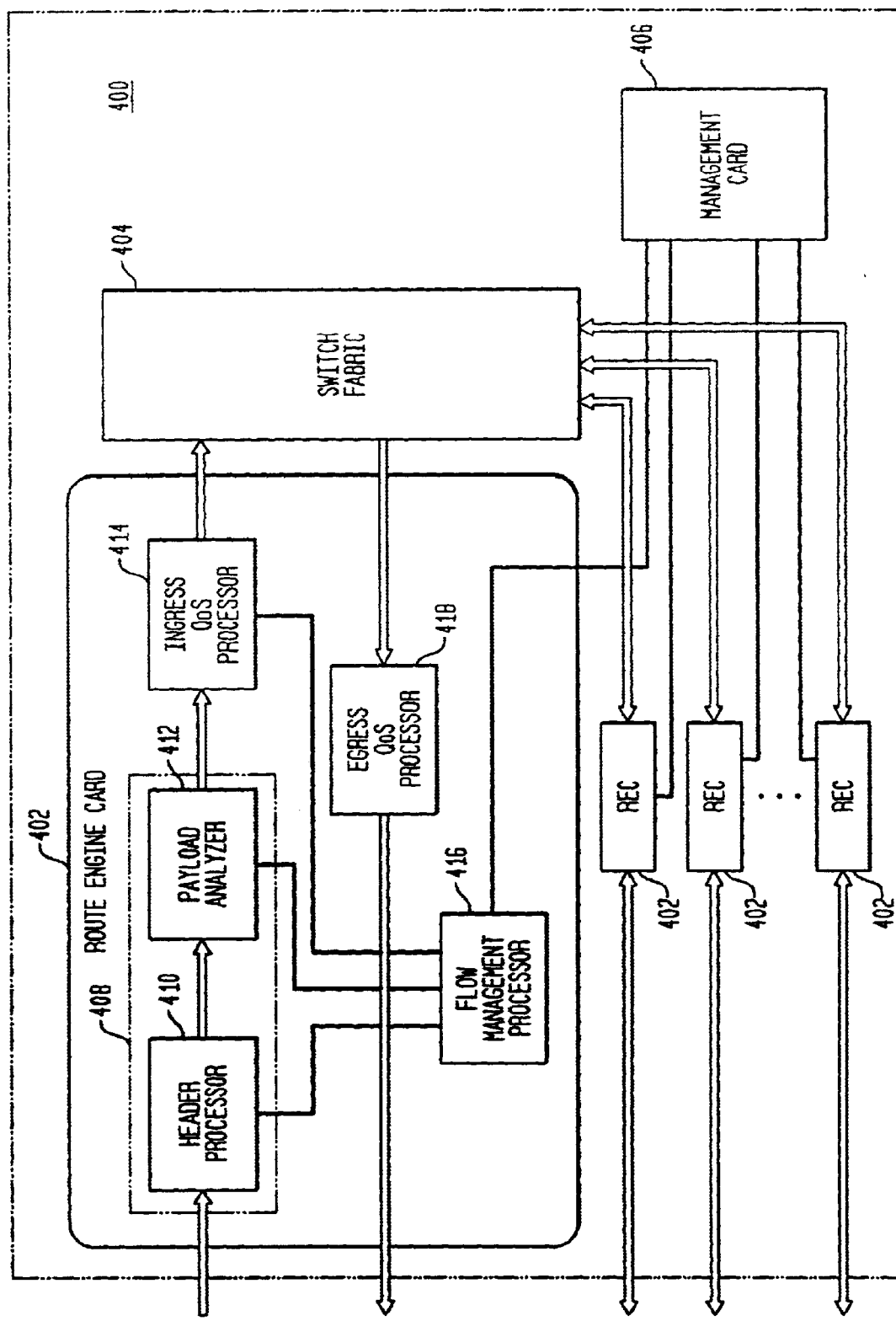

CONTENT AWARE NETWORK APPARATUS

TECHNICAL FIELD OF THE INVENTION

The present invention relates to broadband data networking equipment. Specifically, the present invention relates to a network device that classifies and modifies traffic based on protocol, destination, source and payload content.

BACKGROUND OF THE INVENTION

The character and requirements of networks and networking hardware are changing dramatically as the demands on networks change. Not only is there an ever-increasing demand for more bandwidth, the nature of the traffic flowing on the networks is changing. With the demand for video and voice over the network in addition to data, end users and network providers alike are demanding that the network provide services such as quality-of-service (QoS), traffic metering, and enhanced security. However, the existing Internet Protocol (IP) networks were not designed to provide such services because of the limited information they contain about the nature of the data passing over them.

Existing network equipment that makes up the infrastructure was designed only to forward data through the network's maze of switches and routers without any regard for the nature of the traffic. The equipment used in existing networks, such as routers, switches, and remote access servers (RAS), are not able to process any information in the network data stream beyond the packet headers and usually only the headers associated with a particular layer of the network or with a set of particular protocols. Inferences can be made about the type of traffic by the particular protocol, or by other information in the packet header such as address or port numbers, but high-level information about the nature of the traffic and the content of the traffic is impossible to discern at wire speeds.

In order to better understand packet processing and the deficiencies of existing network equipment it is helpful to have an understanding of its basic operation. The functionality of most network equipment can be broken down into four basic components. The first component is the physical layer interface (PHY layer) which converts an analog waveform transmitted over a physical medium such as copper wire pairs, coaxial cable, optical fiber, or air, into a bit stream which the network equipment can process, and vise versa. The PHY layer is the first or last piece of silicon that the network data hits in a particular device, depending on the direction of traffic. The second basic functional component is the switch fabric. The switch fabric forwards the traffic between the ingress and egress ports of a device across the bus or backplane of that device. The third component is host processing, which can encompass a range of operations that lie outside the path of the traffic passing thought a device. This can include controlling communication between components, enabling configuration, and performing network management functions. Host processors are usually off-the-shelf general purpose RISC or CISC microprocessors.

The final component is the packet processing function, which lies between the PHY layer and the switch fabric. Packet processing can be characterized into two categories of operation, those classified as fast-path and those classified as slow-path. Fast-path operations are those performed on the live data stream in real time. Slow-path operations are performed outside the flow of traffic but are required to forward a portion of the packets processed. Slow-path operations include unknown address resolution, route calculation, and routing and forwarding table updates. Some of the slow-path operations can be performed by the host processor if necessary.

For a piece of network equipment to be useful and effective, the vast majority of traffic must be handled on the fast-path in order to keep up with network traffic and to avoid being a bottleneck. To keep up with the data flow fast-path operations have always been limited both in number and in scope. There are five basic operations that have traditionally been fast-path operations: framing/parsing, classification, modification, encryption/compression, and queuing.

Traditionally the fast-path operations have been performed by a general purpose microprocessor or custom ASICs. However, in order to provide some programmability while maintaining speed requirements, many companies have recently introduced highly specialized network processors (NPUs) to operate on the fast-path data stream. While NPUs are able to operate at the same data rates as ASICs, such as OC-12, OC-48 and OC-192, they provide some level of programmability. Even with state of the art NPUs, however, fast-path operations must still be limited to specific, well-defined operations that operate only on very specific fields within the data packets. None of the current network devices, even those employing NPUs, are able to delve deep into a packet, beyond simple header information and into the packet contents while on the fast-path of data flow. The ability to look beyond the header information while still in the fast-path and into the packet contents would allow a network device to identify the nature of the information carried in the packet, thereby allowing much more detailed packet classification. Knowledge of the content would also allow specific contents to be identified and scanned to provide security such as virus detection, denial of service (DoS) prevention, etc. Further, looking deeper into the data packets and being able to maintain an awareness of content over an entire traffic flow would allow for validation of network traffic flows, and verification of network protocols to aid in the processing of packets down stream.

Accordingly, what is needed is a network device that can look beyond simple header information and into the packet contents or payload, to be able to scan the payload on the fast-path at wire speeds beyond 1 gigabit per second, and to be able to maintain state information or awareness throughout an entire data traffic flow.

SUMMARY OF THE INVENTION

The present invention provides for a network device or apparatus that is able to scan the entire contents of data packets forming a network data flow. The network device consists of a traffic flow scanning processor, or engine, operable to scan the contents of any or all data packets received from the network. The contents of the data packet include both the header information and the payload contents. The traffic flow scanning processor can be divided into a header processor and a payload analyzer. The header processor is capable of scanning the header information, determining routing requirements based on the header information, and creating a unique session id based on predetermined attributes of the data packet for identifying each individual active traffic flow within the network apparatus. The payload analyzer scans the contents of data packet's payload and attempts to match the payload contents against a database of known strings. If a match is detected in the payload analyzer, the network apparatus is operable to perform a variety of programmable functions on the data packet or on the particular traffic flow to which the data packet is associated. In addition, the traffic flow scanning processor is able to maintain state awareness across each individual traffic flow.

In addition to the traffic flow scanning processor the network apparatus includes a quality of service processor. The quality of service processor is connected to the traffic flow scanning engine and receives the scanned data packets along with one or more conclusions or instructions from the scanning engine associated with each data packet. The quality of service processor is then operable to place each data packet into one of a plurality of quality of service queues according to the associated conclusions. The quality of service queue determines the priority of the associated data for transmission back onto the network. In addition to the quality of service queues for traffic management and traffic shaping, the quality of service processor includes a packet modification engine operable to change one or more bits of a data packet in accordance with the associated conclusions.

A routing network apparatus can be constructed using two or more route engine cards connected through a switch fabric and controlled by a management card. Each of the route engine cards includes a traffic flow scanning engine and at least one quality of service processor. The traffic flow scanning engine scans any or all of the data packets and develops an instruction or conclusion based on the contents of the data packet and maintains a state awareness across each individual traffic flow. The quality of service processor then places the data packet into a quality of service queue and modifies the packet as required for routing, quality, or security purposes. The quality of service processor then sends the data packets to the switch fabric which routes the data packets to the route engine card associated with its physical egress port. The quality of service processor on the egress route engine card acts as a buffer between the switch fabric and the physical egress ports and allocates access to the physical egress ports based on packet priority.

In addition to the traffic flow scanning engine and the quality of service processor(s), the network device may also include a physical interface, a flow management processor, or a microprocessor. The physical interface receives the analog signals off the physical network connections and turns the signal into a bit stream capable of being processed by the network apparatus, and vise versa. The flow management engine and the microprocessor act to manage, or configure, the traffic flow scanning engine and the quality of service processor as well as to process odd packets not able to be processed by the traffic flow scanning engine and keep traffic flow metrics and statistics.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 is a block diagram of a routing network apparatus according to the present invention.

DETAILED DESCRIPTION OF THE DRAWINGS

Figure 1:
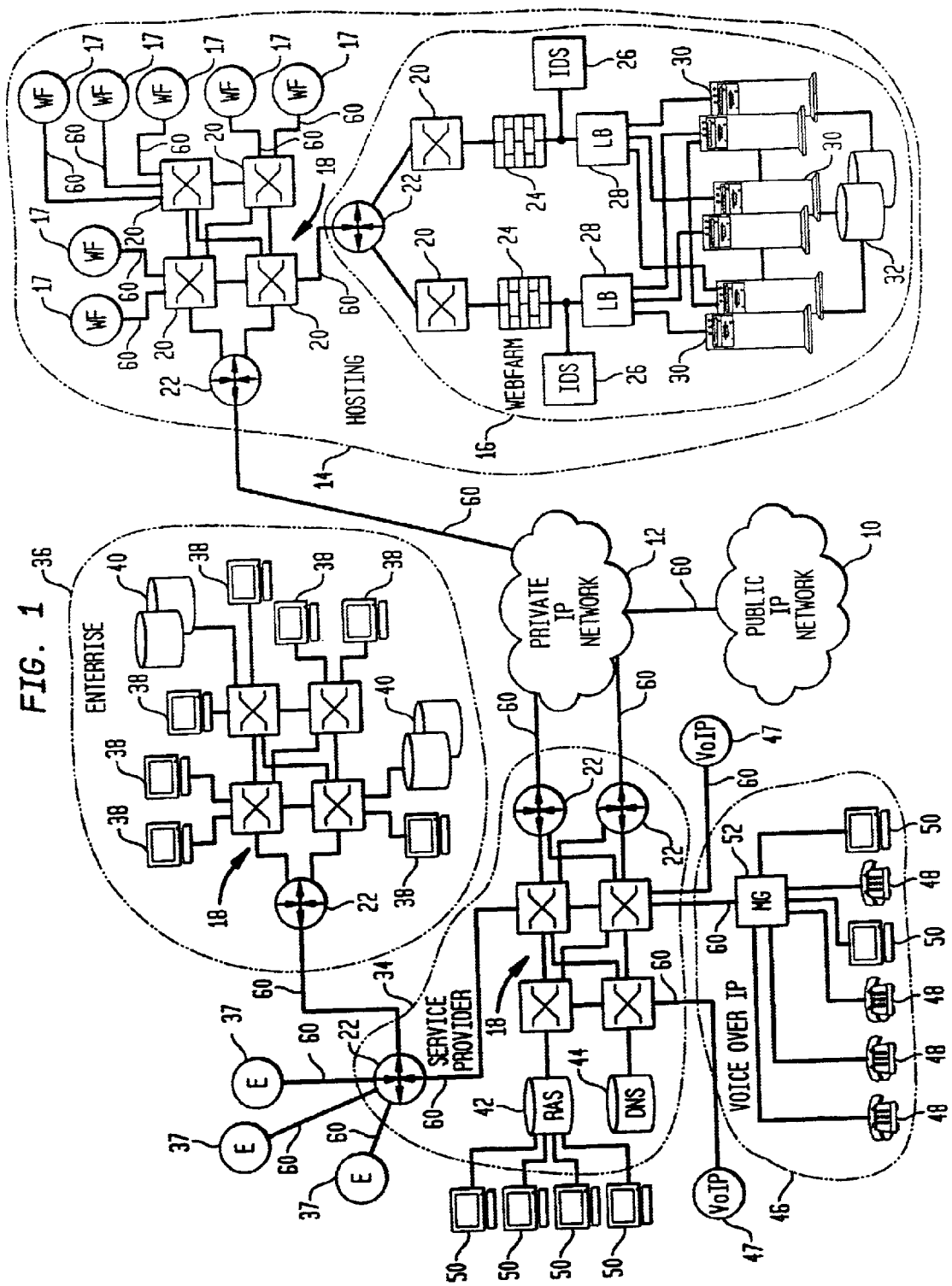
FIG. 1 is a network topology diagram illustrating example environments in which the present invention can operate.

Referring now to FIG. 1, a network topology is shown which is an example of several network infrastructures that connect in some manner to a broader public IP network 10 such as the internet. FIG. 1 is in no way meant to be a precise network architecture, but only to serve as a rough illustration of a variety of network structures which can exist on a broadband IP network. Public IP network 10 can be accessed in a variety of ways. FIG. 1 shows the public IP network being accessed through a private IP network 12 which can be the IP network of a company such as MCI or UUNET which provide private core networks. An endless variety of network structures can be connected to private IP network 12 in order to access other networks connected to private IP network 12 or to access public IP network 10.

One example of a network structure connecting to private IP network 12 is hosting network 14. Hosting network 14 is an example of a network structure that provides hosting services for internet websites. These hosting services can be in the form of webfarm 16. Webfarm 16 begins with webservers 30 and database 32 which contain the webpages, programs and databases associated with a particular website such as amazon.com or yahoo.com. Webservers 30 connect to redundant load balancers 28 which receive incoming internet traffic and assign it to a particular webserver to balance the loads across all of webservers 30. Redundant intrusion detection systems 26 and firewalls connect to load balancers 28 and provide security for webfarm 16. Individual webfarms 16 and 17 connect to hosting network 14's switched backbone 18 by means of a network of switches 20 and routers 22. Hosting network 14's switched backbone 18 is itself made up of a network of switches 20 which then connect to one or more routers 22 to connect to private IP network 12. Connections between individual webfarms 16 and 17 and the switched backbone 18 of hosting network 14 are usually made at speeds such as OC-3 or OC-12 (approx. 150 megabits/sec or 625 megabits/sec), while the connection from router 22 of hosting network 14 to private IP network 12 are on the order OC-48 speeds (approx. 2.5 gigabits/sec).

Another example of network structures connecting to private IP network are illustrated with service provider network 34. Service provider network 34 is an example of a network structure for Internet Service Providers (ISPs) or Local Exchange Carriers (LECs) to provide both data and voice access to private IP network 12 and public IP network 10. Service provider network 34 provides services such as internet and intranet access for enterprise networks 36 and 37. Enterprise networks 36 and 37 are, for example, company networks such as the company network for Lucent Technologies or Merril Lynch. Each enterprise network, such as enterprise network 36, includes a plurality of network servers and individual workstations connected to a switched backbone 18, which can be connected by routers 22 to service provider network 34.

In addition to internet access for enterprise networks, service provider network 34 provides dial-up internet access for individuals or small businesses. Dial-up access is provided in service provider network 34 by remote access server (RAS) 42, which allows personal computers (PCs) to call into service provider network 34 through the public switched telephone network (PSTN), not shown. Once a connection has been made between the PC 50 and RAS 42 through the PSTN, PC 50 can then access the private or public IP networks 12 and 10.

Service provider network 34 also provides the ability to use the internet to provide voice calls over a data network referred to as Voice over IP (VoIP). VoIP networks 46 and 47 allow IP phones 48 and PCs 50 equipped with the proper software to make telephone calls to other phones, or PCs connected to the internet or even to regular phones connected to the PSTN. VoIP networks, such as VoIP network 46, include media gateways 52 and other equipment, not shown, to collect and concentrate the VoIP calls which are sent through service provider network 34 and private and public internet 12 and 10 as required. As mentioned, the advent of VoIP as well as other real time services such as video over the internet make quality of service a priority for service providers in order to match the traditional telephone service provided by traditional telephone companies.

Service provider network 34 includes a switched backbone 18 formed by switches 20 as well as routers 22 between it and its end users and between it and private IP network 12. Domain name servers 44 and other networking equipment, which are not shown, are also included in service provider network 34. Similar to hosting network 34, connection speeds for service provider network 34 can range from speeds such as T1, T3, OC-3 and OC-12 for connecting to enterprise networks 37 and 37 as well as VoLP networks 46 and 47 all the way to OC-48 and conceivably even OC-192 for connections to the private IP network.

It can easily be seen that aggregation points 60 exist at the edges of these various network structures where data is passed from one network structure to another at speeds such as OC-3, OC-12, and OC-48. One major problem in the network structures shown in FIG. 1 is the lack on any type of intelligence at these aggregation points 60 which would allow the network to provide services such as security, metering and quality of service. The intelligence to provide these services would require that the network understand the type of data passing through the aggregation points 60 and not just the destination and/or source information which is currently all that is understood. Understanding the type of data, or its contents, including the contents of the associated payloads as well as header information, and further understanding and maintaining a state awareness across each individual traffic flow would allow the network to configure itself in real time to bandwidth requirements on the network for applications such as VoIP or video where quality of service is a fundamental requirement. An intelligent, or "content aware", network would also be able to identify and filter out security problems such as email worms, viruses, denial of service (DoS) attacks, and illegal hacking in a manner that would be transparent to end users. Further, a content aware network would provide for metering capabilities by hosting companies and service providers, allowing these companies to regulate the amount of bandwidth allotted to individual customers as well as to charge precisely for bandwidth and additional features such as security.

In accordance with the requirements set forth above, the present invention provides for a network device that is able to scan, classify, and modify network traffic including payload information at speeds of OC-3, OC-12, OC-48 and greater thereby providing a "content aware" network.

Figure 2:
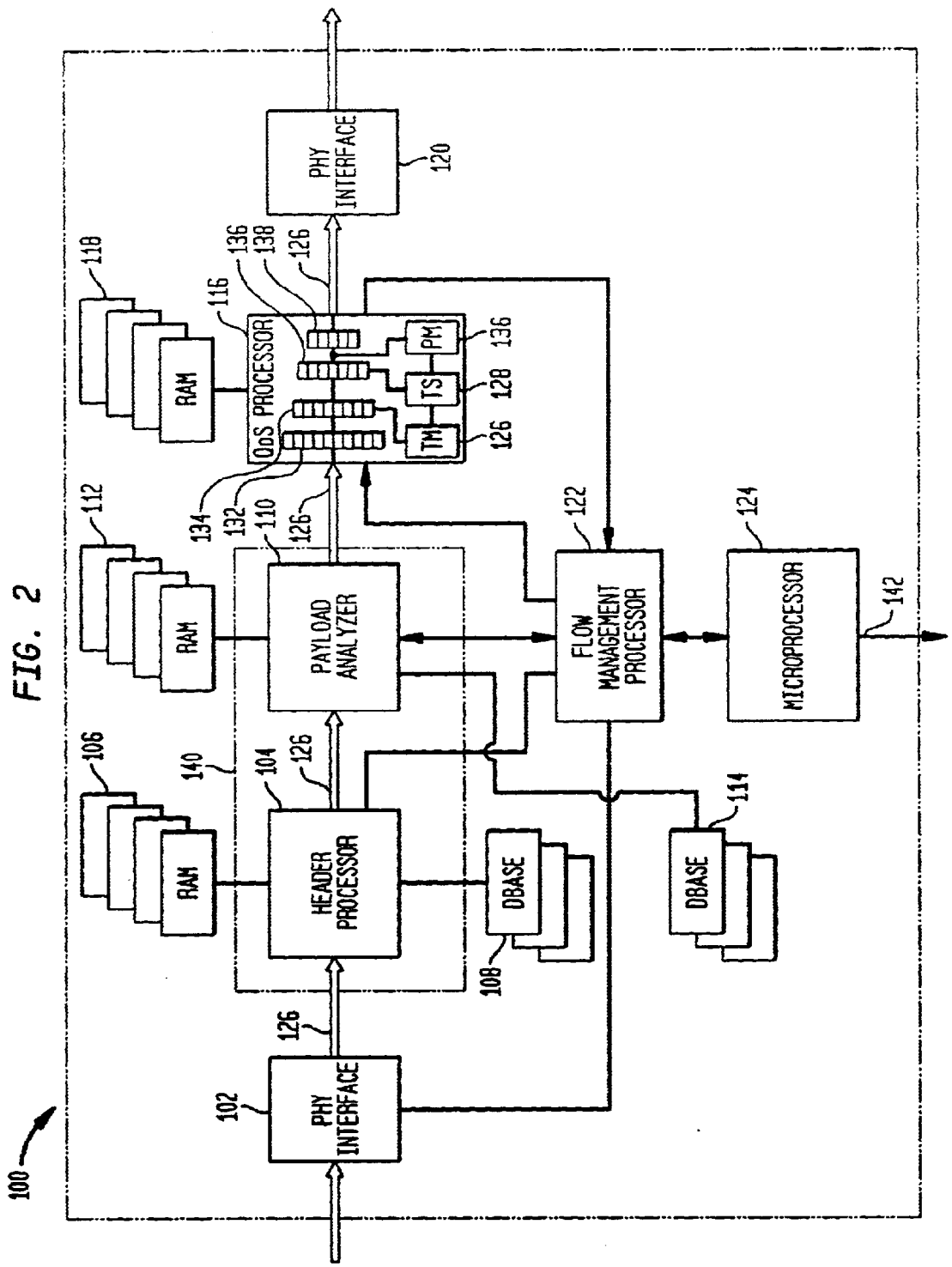
FIG. 2 is a block diagram of a "bump-in-the-line" network apparatus according to the present invention.

Referring now to FIG. 2, one embodiment of a network apparatus according to the present invention is shown. Network apparatus 100, as shown, acts as a "bump-in-the-line" type device by accepting data received from a high-speed network line, processing the data, and then placing the data back on the line. Network apparatus 100 accepts data from the line by means of input physical interface 102. Input physical interface 102 can consist of a plurality of ports, and can accept any number of network speeds and protocols, including such high speeds as OC-3, OC-12, OC-48, and protocols including 10/100 Ethernet, gigabit Ethernet, and SONET. Input physical interface 102 takes the data from the physical ports, frames the data, and then formats the data for placement on fast-path data bus 126 which is preferably an industry standard data bus such as a POS-PHY Level 3, or an ATM UTOPIA Level 3 type data bus.

Fast-path data bus 126 feeds the data to traffic flow scanning processor 140, which includes header processor 104 and payload analyzer 110. The data is first sent to header processor 104, which is operable to perform several operations using information contained in the data packet headers. Header processor 104 stores the received data packets in packet storage memory 106 and scans the header information. The header information is scanned to identify the type, or protocol, of the data packet, which is used to determine routing information as well as to create a session id using predetermined attributes of the data packet.

In the preferred embodiment, a session id is created using session information consisting of the source address, destination address, source port, destination port and protocol, although one skilled in the art would understand that a session id could be created using any subset of fields listed or any additional fields in the data packet without departing from the scope of the present invention. When a data packet is received that has new session information the header processor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header processor 104 the session id can be created anywhere in traffic flow scanning engine 140 including in payload analyzer 110.

As will be discussed below, network apparatus 100 in order to function properly needs to reorder out of order data packets and reassemble data packet fragments. Header processor 104 is operable to perform the assembly of asynchronous transfer mode (ATM) cells into complete data packets (PDUs), which could include the stripping of ATM header information.

Header processor 104 is also operable to perform routing functions. Routing tables and information can be stored in database memory 108. Routing instructions received by network apparatus 100 are identified, recorded and passed to microprocessor 124 by header processor 104 so that microprocessor 124 is able to update the routing tables in database memory 108 accordingly. While network apparatus 100 is referred to as a "bump-in-the-line" apparatus, The input and the output could be formed by multiple lines, for example four OC-12, lines could be connected to network apparatus 100 which operates at OC-48 speeds. In such a case, "bump-in-the-line" network apparatus 100 will have limited routing or switching capabilities between the multiple lines, although the switching capability will be less than in a conventional router or switch. Additionally, a network apparatus can be constructed according to the principles of the present invention, which is able to operate as a network router or switch. Such an implementation is discussed in greater detail with reference to FIG. 4.

After data packets have been processed by header processor 104 the data packets, their associated session id and any conclusion formed by the header processor, such as routing or QoS information, are sent on fast-data path 126 to the other half of traffic flow scanning engine 140, payload analyzer 110. The received packets are stored in packet storage memory 112 while they are processed by payload analyzer 110. Payload analyzer 110 is operable to scan the contents of data packets received from header processor 104, particularly the payload contents of the data packets, although header information can also be scanned as required. The contents of any or all data packets are compared to a database of known signatures and if the contents of a data packet or packets matches a known signature, an action associated with that signature and/or session id can be taken by network apparatus 100. Additionally, payload analyzer 110 is operable to maintain state awareness throughout each individual traffic flow. In other words, payload analyzer 110 maintains a database for each session which stores state information related to not only the current data packets from a traffic flow, but state information related to the entirety of the traffic flow. This allows network apparatus 100 to act on not only based on the content of the data packets being scanned but also based on the contents of the entire traffic flow. The specific operation of payload analyzer 110 will be described with reference to FIG. 3.

Once the contents of the packets have been scanned and a conclusion reached by traffic flow scanning engine 140, the packets and the associated conclusions of either or both the header processor and the payload analyzer are sent to quality of service (QoS) processor 116. QoS processor 116 again stores the packets in its own packet storage memory 118 for forwarding. QoS processor 116 is operable to perform the traffic flow management for the stream of data packets processed by network apparatus 100. QoS processor contains engines for traffic management 126, traffic shaping 128 and packet modification 130.

QoS processor 116 takes the conclusion of either or both of header processor 104 and payload analyzer 110 and assigns the data packet to one of its internal quality of service queues 132 based on the conclusion. The quality of service queues 132 can be assigned priority relative to one another or can be assigned a maximum or minimum percentage of the traffic flow through the device. This allows QoS processor to assign the necessary bandwidth to traffic flows such as VoIP, video and other flows with high quality and reliability requirements while assigning remaining bandwidth to traffic flows with low quality requirements such as email and general web surfing to low priority queues. Information in queues that do not have the available bandwidth to transmit all the data currently residing in the queue according to the QoS engine is selectively discarded thereby removing that data from the traffic flow.

The quality of service queues 132 also allow network apparatus 100 to manage network attacks such as denial of service (DoS) attacks. Network apparatus 100 can act to qualify traffic flows by scanning the contents of the packets and verifying that the contents contain valid network traffic between known sources and destinations. Traffic flows that have not been verified because they are from unknown sources or because they are new unclassified flows can be assigned to a low quality of service queue until the sources are verified or the traffic flow classified as valid traffic. Since most DoS attacks send either new session information, data from spoofed sources, or meaningless data, network apparatus 100 would assign those traffic flows to low quality traffic queues. This ensures that the DoS traffic would receive no more that a small percentage (i.e. 5%) of the available bandwidth thereby preventing the attacker from flooding downstream network equipment.

The QoS queues 132 in QoS processor 116 (there are 65 k queues in the present embodiment of the QoS processor although any number of queues could be used) feed into schedulers 134 (1024 in the present embodiment), which feed into logic ports 136 (256 in the present embodiment), which send the data to flow control port managers 138 (32 is the present embodiment) which can correspond to physical egress ports for the network device. The traffic management engine 126 and the traffic shaping engine 128 determine the operation of the schedulers and logic ports in order to maintain traffic flow in accordance with the programmed parameters.

QoS processor 116 also includes packet modification engine 130, which is operable to modify, add, or delete bits in any of the fields of a data packet. This allows QoS processor 116 to change addresses for routing or to place the appropriate headers on the data packets for the required protocol. The packet modification engine 130 can also be used to change information within the payload itself if necessary. Data packets are then sent along fast-data path 126 to output PHY interface 120 where it is converted back into an analog signal and placed on the network.

As with all network equipment, a certain amount of network traffic will not be able to be processed along fast-data path 126. This traffic will need to be processed by on board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through network apparatus 100. In addition to processing odd, or missing packets, microprocessor 124 also controls the user management interface 142 and recompiles databases 108 and 114 to accommodate new signatures and can be used to learn and unlearn sessions identified by the traffic flow scanning engine 140.

The abilities of network apparatus 100 are unique in a number of respects. Network apparatus 100 has the ability to scan the contents of any data packet or packets for any information that can be represented as a signature or series of signatures. The signatures can be of any arbitrary length, can begin and end anywhere within the packets and can cross packet boundaries. Further, network apparatus 100 is able to maintain state awareness throughout all of the individual traffic flow by storing state information for each traffic flow representing any or all signatures matched during the course of that traffic flow. Existing network devices operate by looking for fixed length information at a precise point within each data packet and cannot look across packet boundaries. By only being able to look at fixed length information at precise points in a packet, existing network equipment is limited to acting on information contained at an identifiable location within some level of the packet headers and cannot look into the payload of a data packet much less make decisions on state information for the entire traffic flow or even on the contents of the data packet including the payload.

Figure 3:
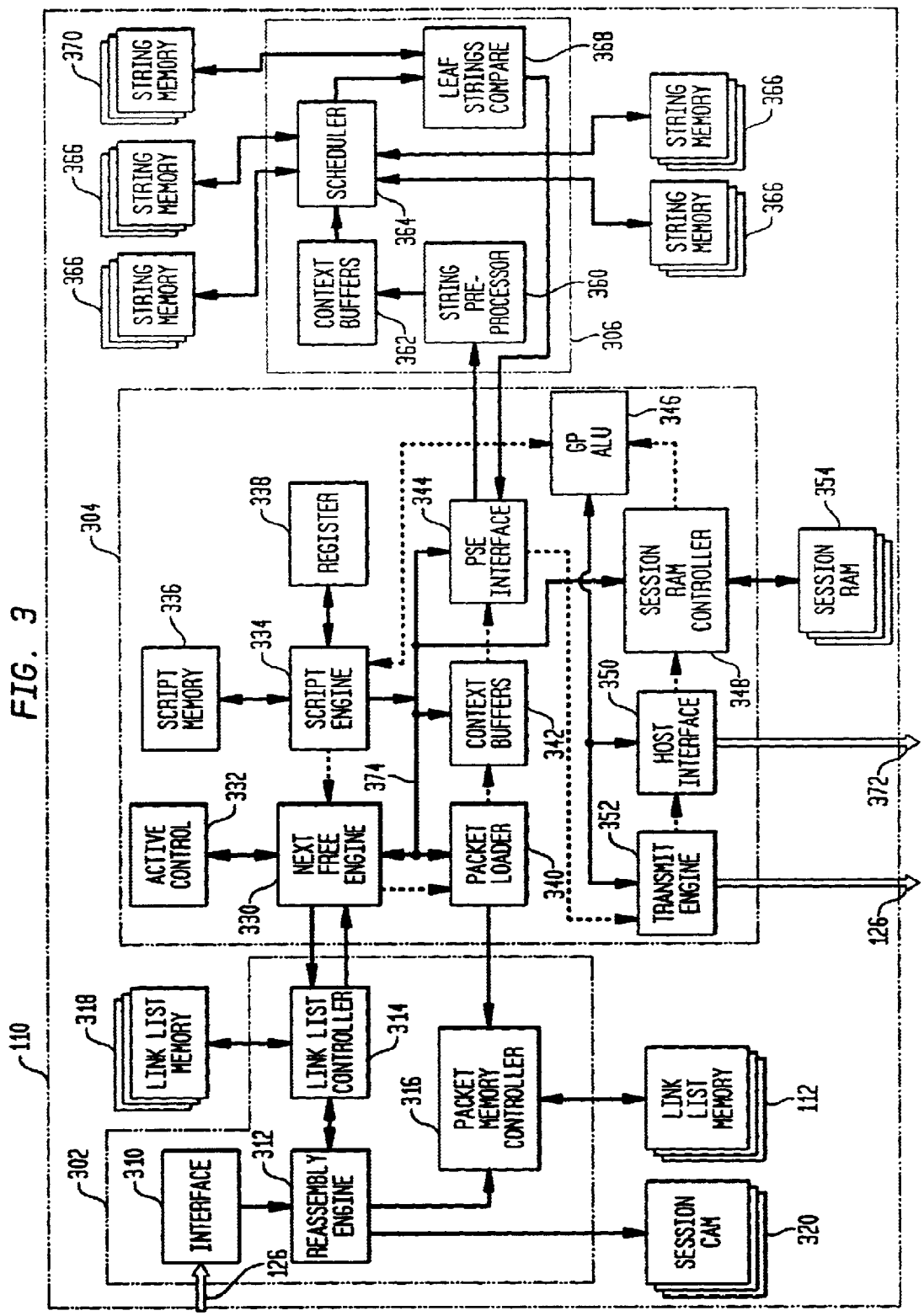
FIG. 3 is a block diagram of the payload scanning engine from FIG. 2.

Referring now to FIG. 3, the payload analyzer 110 of FIG. 2 is described in greater detail. As described above payload analyzer 110 is operable to scan the contents of data packets forwarded from header processor 104 from FIG. 2. Payload analyzer 110 includes three separate engines, queue engine 302, context engine 304, and payload scanning engine 306.

Since payload analyzer 110 scans the contents of the payload, and is able to scan across packet boundaries, payload analyzer 110 must be able reassemble fragmented packets and reorder out of order packets on a per session basis. Reordering and reassembling is the function of queue engine 302. Queue engine 302 receives data off the fast-path data bus 126 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. Session CAM 320 can store the session id generated by queue engine 302 of payload analyzer 110. Reordering and reassembly engine 312 uses the session id to link data packets belonging to the same data flow.

In order to obtain the high throughput speeds required, payload analyzer 110 must be able to process packets from multiple sessions simultaneously. Payload analyzer 110 processes blocks of data from multiple data packets each belonging to a unique traffic flow having an associated session id. In the preferred embodiment of the present invention, payload analyzer 110 processes 64 byte blocks of 64 different data packets from unique traffic flows simultaneously. Each of the 64 byte blocks of the 64 different data flows represents a single context for the payload analyzer. The scheduling and management of all the simultaneous contexts for payload analyzer 110 is handled by context engine 304.

Context engine 304 works with queue engine 302 to select a new context when a context has finished processing and been transmitted out of payload analyzer 110. Next free context/next free block engine 330 communicates with link list controller 314 to identify the next block of a data packet to process. Since payload analyzer 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified packet loader 340 uses the link list information retrieved by the next free context/next free block engine to retrieve the required block of data from packet memory 112 using packet memory controller 316. The new data block is then loaded into a free buffer from context buffers 342 where it waits to be retrieved by payload scanning engine interface 344.

Payload scanning engine interface 344 is the interface between context engine 304 and payload scanning engine 306. When payload scanning engine 306 has room for a new context to be scanned, payload scanning engine interface 344 sends a new context to string preprocessor 360 in payload scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by scheduler 364. Scheduler controls the input and output to signature memory 366. While four signature memories 366, each of which is potentially capable of handling multiple contexts, are shown any number could be used to increase or decrease the throughput through payload scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memory 370 to perform a bit to bit comparison of the context and the potentially matched string.

The conclusion of the payload scanning are then sent back to the payload scanning interface 344 along with possibly a request for new data to be scanned. The conclusion of the payload scanning can be any of a number of possible conclusions. The scanning may not have reached a conclusion yet and may need additional data from a new data packet to continue scanning in which case the state of the traffic flow and any incomplete scans are stored in session memory 354 along with other appropriate information such as sequence numbers, counters etc. The conclusion reached by signature memory 366 may also be that scanning is complete and there is or isn't a match, in which case the data packet and the conclusion are sent to transmit engine 352 for passing to QoS processor 116 from FIG. 2. The scanning could also determine that the data packet needs to be forwarded to microprocessor 124 from FIG. 2 for further processing, so that the data packet is sent to host interface 350 and placed on host interface bus 372. In addition to handling odd packets, host interface bus 350 allows microprocessor 124 to control any aspect of the operation of payload analyzer 110 by letting microprocessor 124 write to any buffer or register in context engine 304.

State information is stored in session memory 354 and is updated as necessary after data associated with the particular traffic flow is scanned. The state information for each traffic flow represents the content awareness of network apparatus 100 from FIG. 2, and allows network apparatus to act not only on the information scanned, but also on all the information that has been scanned for each traffic flow.

The operation of transmit engine 352, host interface 350, session memory controller 348, which controls the use of session memory 354, and of general-purpose arithmetic logic unit (GP ALU) 346, which is used to increment or decrement counter, move pointers, etc., is controlled by script engine 334. Script engine 334 operates to execute programmable scripts stored in script memory 336 using registers 338 as necessary. Script engine 334 uses control bus 374 to send instruction to any of elements in context engine 304.

As can be seen from the description of FIG. 3, payload analyzer 110 allows the entire contents of any or all data packets received by a network device to be scanned against a database of known signatures. The scanned contents can be any variable or arbitrary length and can even cross packet boundaries. The abilities of payload analyzer 110 allow the construction of a network device that is content aware which gives the network device the ability to operate on data packets based on the content of that data packet as has already been described herein.

Referring now to FIG. 4 an embodiment of the network apparatus of the present invention with routing capabilities is described. Routing network apparatus 400 is formed by two or more route engine cards 402 connected to switch fabric 404. One or more management cards 406 are also included to provide a user interface and to manage route engine cards 402. Each of route engine cards 402 operate fundamentally as described with respect to network apparatus 100 of FIG. 2. Traffic flow scanning engine 408, formed by header processor 410 and payload analyzer 412, scans the contents of the data packets and generates a conclusion based on the contents. The packets and associated conclusions are forwarded to ingress QoS processor 414, which assigns the packets to a QoS queue. The data packets are then sent to the switch fabric, which forwards the data packets to the proper route engine card 402 for it's assigned output port. The data packet then flows through the egress QoS processor 418, which schedules the traffic received from all the route engine cards 402 for transmission onto the network. The microprocessor 124 shown in FIG. 2 could be present on the route engine card 402 or could potentially be moved to the management card 406 to allow one microprocessor to support multiple route engine cards 402. Each of the route engine cards 402 could even have its own microprocessor with an additional microprocessor on management card 406.

Having multiple route engine cards with multiple ingress and egress paths allows routing network apparatus to function as a routing network device, as opposed to the single ingress and egress path of the "bump-in-the-line" device described with respect to FIG. 2. This allows the routing functions of header processor 410 to be utilized in routing network apparatus 400.

While the header processor, the QoS processors, and the flow management processor described with reference to FIGS. 2 and 4 can be any suitable processor capable of executing the described functions, in the preferred embodiment the header processor is the Fast Pattern Processor (FPP), the QoS processor is the Routing Switch Processor (RSP), and the flow management processor is the ASI processor, all manufactured by the Agere Division of Lucent Technologies, Austin Tex. Similarly the switch fabric may be any suitable switch fabric as is well known in the industry, including those manufactured by Power X Networks, Inc., 2833 Junction Ave., Suite 110, San Jose, Calif. The microprocessor described with reference to FIGS. 2 and 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network apparatus, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A network apparatus connected to a data network passing data packets of a plurality of types and having a plurality of destinations and sources, each data packet consisting of a header and a payload, the network apparatus comprising:

a header processor receiving the data packets from the data network and operable to scan the header to determine the type of the data packet, the source of the data packet, and the destination of the data packets and to classify the data packets based on attributes of the data packets;

a payload analyzer connected to the header processor and operable to scan the payload of each data packet, wherein the payload analyzer can further classify the data packet according to the contents of the payload; and a quality of service processor connected to the payload analyzer and operable to process each data packet based on its classification.

2. The network apparatus of claim 1 further comprising a physical interface operable to convert an input analog signal from a network transmission line into a bit stream comprising the data packets from the data network, and further operable to convert a bit stream from the quality of service processor to an output analog signal capable of transmission on the data network.

3. The network apparatus of claim 1 further comprising a flow management processor and a microprocessor operable to manage the header processor, the payload analyzer and the quality of service processor.

4. The network apparatus of claim 3 wherein the flow management processor and the microprocessor are further operable to collect network traffic flow metrics and statistics and to report back to a network manager.

5. The network apparatus of claim 1 wherein the network apparatus is operable to generate a unique session id for each individual traffic flow based on a source address, a destination address, a source port, a destination port and a protocol.

6. The network apparatus of claim 5 wherein the network apparatus is able to learn and maintain a state for each of the individual traffic flows.

7. The network apparatus of claim 5 wherein the payload analyzer includes a queue engine, a context engine and a payload scanning engine, the queue engine operable to reorder and reassemble the data packets, the context engine operable to manage data packets associated with a plurality of session ids and to schedule the operation of the payload scanning engine, and the payload scanning engine operable to compare the payload of the data packet with a database of known strings.

8. The network apparatus of claim 1 wherein the quality of service processor includes a plurality of quality of service queues, the quality of service processor operable to assign the data packets to one of the plurality of quality of service queues based on the classifications from the header processor and the payload analyzer, the quality of service queue determining the priority of the data packet on the data network.

9. The network apparatus of claim 1 wherein the attributes of the data packets are the type, the destination and the source of the data packets.

10. A network device as part of a data network, the data network including a stream of data packets of a plurality of protocols and a plurality of destinations and sources, each data packet containing header information and payload information, the network device comprising:

a traffic flow scanning processor operable to scan the header information and the payload information of each data packet, the traffic flow scanning processor including at least one reassembly and reordering engine which ensures that the data packets are properly assembled and ordered, and further includes at least one scanning engine which scans the data packet, matches information in the data packet with a database of known signatures, and produces an associated conclusion based on the matching of information in the data packet; and a quality of service processor connected to the traffic flow scanning processor and receiving the data packets and the associated conclusion, the quality of service processor operable to interpret the conclusion and to place the data packet onto one of a plurality of quality of service queues contained within the quality of service processor, the quality of service queue determined by the associated conclusion, wherein the data packet in then transmitted from the quality of service queue to the data network.

11. The network device of claim 10 further comprising a physical interface connected to the traffic flow scanning processor and the quality of service processor, the physical interface including input ports that receive an input analog signal from the data network and converts the input analog signal into an input bit stream containing the data packets and output ports for receiving an output bit stream and converting the output bit stream into an output analog signal sent out onto the data network.

12. The network device of claim 10 wherein the traffic flow scanning processor associates each data packet with a session id, the session id representing an individual traffic flow within the data network.

13. The network device of claim 12 wherein the session id is determined from a source address, a destination address, a source port, a destination port, and a protocol.

14. The network device of claim 12 wherein the network device is able to learn and maintain state for each of the individual traffic flows.

15. The network device of claim 10 wherein the traffic flow scanning processor is divided into a header processor and a payload analyzer.

16. The network device of claim 15 wherein the payload analyzer includes a queue engine, a context engine, and a payload scanning engine.

17. The network device of claim 16 wherein the context engine operable to manage data packets associated with a plurality of session ids and to schedule the operation of the payload scanning engine, and the payload scanning engine operable to compare the payload of the data packet with a database of known strings.

18. The network apparatus of claim 10 wherein the quality of service queue determines the priority of the data packet on the data network.

19. The network apparatus of claim 10 further comprising a flow management processor and a microprocessor operable to control the traffic flow scanning processor and to collect network traffic flow metrics and statistics and to report back to a network manager.

20. The network apparatus of claim 10 wherein the associated conclusion is an instruction executable by the network device.

21. A network device as part of a data network, the data network including a stream of data packets of a plurality of protocols and a plurality of destinations and sources, each data packet containing header information and payload information, the network device comprising:

a physical interface which includes input ports that receive an input analog signal from the data network and converts the input analog signal into an input bit stream containing the data packets and output ports for receiving an output bit stream and converting the output bit stream into an output analog signal sent out onto the data network;

a plurality of route engines each route engine further comprising:

a traffic flow scanning processor connected to the physical interface to receive the input bit stream, the traffic flow scanning processor operable to scan the header information and the payload information of each data packet, the traffic flow scanning processor including at least one reassembly and reordering engine which ensures that the data packets are properly assembled and ordered, and further includes at least one scanning engine which scans the data packet, matches information in the data packet with a database of known signatures, and produces an associated conclusion based on the matching of information in the data packet;

at least one quality of service processor connected to the traffic flow scanning processor and receiving the data packets and the associated conclusion, the at least one quality of service processor operable to interpret the conclusion and to place the data packet onto one of a plurality of quality of service queues contained within the at least one quality of service processor, the quality of service queue being determined by the associated conclusion, wherein the data packet in then transmitted from the quality of service queue to a switch fabric interface; and a switch fabric connected between the at least one quality of service processors for at least two or more route engines, such that data packets are sent from one of the at least one quality of service processor associated with an input port for the data packet to the at least one quality of service processor associated with an appropriate output port for the data packet, such that the network device is operable as a network router.

22. The network device of claim 21 wherein the traffic flow scanning processor associates each data packet with a session id, the session id representing an individual traffic flow within the data network.

23. The network device of claim 22 wherein the session id is determined from a source address, a destination address, a source port, a destination port, and a protocol.

24. The network device of claim 22 wherein the network device is able to learn and maintain state for each of the individual traffic flows.

25. The network device of claim 21 wherein the traffic flow scanning processor is divided into a header processor and a payload analyzer.

26. The network device of claim 25 wherein the payload analyzer includes a queue engine, a context engine, and a payload scanning engine.

27. The network device of claim 26 wherein the context engine operable to manage data packets associated with a plurality of session ids and to schedule the operation of the payload scanning engine, and the payload scanning engine operable to compare the payload of the data packet with a database of known strings.

28. The network apparatus of claim 21 wherein the quality of service queue determines the priority of the data packet on the data network.

29. The network apparatus of claim 22 wherein the flow management processor and the microprocessor are further operable to collect network traffic flow metrics and statistics and to report back to a network manager.

30. The network apparatus of claim 21 wherein the associated conclusion is an instruction executable by the network device.

* * * * *